(12) United States Patent
Kothavale et al.

(10) Patent No.: US 10,536,434 B2
(45) Date of Patent: Jan. 14, 2020

(54) GENERATING AND LINKING PRIVATE TRANSACTION IDENTIFIERS TO DISTRIBUTED DATA REPOSITORIES

(71) Applicant: FortifID, Inc., San Jose, CA (US)

(72) Inventors: Shantanu Rajkumar Kothavale, Cupertino, CA (US); Anirban Basak, San Jose, CA (US)

(73) Assignee: FORTIFID, INC., San Jose, CA (US)

( * ) Notice: Subject to any disclaimer, the term of this patent is extended or adjusted under 35 U.S.C. 154(b) by 0 days.

(21) Appl. No.: 16/219,745

(22) Filed: Dec. 13, 2018

(65) Prior Publication Data
US 2019/0306128 A1  Oct. 3, 2019

Related U.S. Application Data

(60) Provisional application No. 62/651,264, filed on Apr. 2, 2018.

(51) Int. Cl.
| | |
|---|---|
| *G06F 21/00* | (2013.01) |
| *H04L 9/00* | (2006.01) |
| *H04L 29/06* | (2006.01) |
| *H04L 9/06* | (2006.01) |

(Continued)

(52) U.S. Cl.
CPC ..... *H04L 63/0421* (2013.01); *G06Q 20/3678* (2013.01); *H04L 9/0637* (2013.01); *H04L 9/3228* (2013.01)

(58) Field of Classification Search
CPC ...... G06F 21/31; G06F 21/6218; G06F 21/41; G06F 21/45; G06F 2221/2141
See application file for complete search history.

(56) References Cited

U.S. PATENT DOCUMENTS

| | | | |
|---|---|---|---|
| 9,635,000 B1* | 4/2017 | Muftic | ............... H04L 63/0435 |
| 2003/0229783 A1 | 12/2003 | Hardt | |
| 2006/0026042 A1 | 2/2006 | Awaraji et al. | |

(Continued)

OTHER PUBLICATIONS

Nakamoto, Satoshi. (2009). "Bitcoin: A Peer-to-Peer Electronic Cash System", https://bitcoin.org/bitcoin.pdf (downloaded: Mar. 23, 2019). (Year: 2008).*

(Continued)

*Primary Examiner* — Alexander Lagor
(74) *Attorney, Agent, or Firm* — Nicholson De Vos Webster & Elliott LLP

(57) ABSTRACT

Techniques are described for generating semi-random private transaction identifiers for users that are meaningful to data providers and can be used by data providers to perform internal queries for user data. A user provides input to an identity management service indicating the user's consent to link their user account at the identity management service to one or more data providers. The identity management service stores a group blinded transaction identifier (GBTI) based on transaction identifiers generated by one or more data providers. When the user desires to obtain a service from a service provider, the user obtains GBTI-derived value from the identity management service and sends it to the service provider. The service provider sends the GBTI-derived value (and possibly other information) to the data provider to prove that it has the user's consent to obtain desired data or insights about the user but without infringing the user's privacy.

13 Claims, 4 Drawing Sheets

(51) Int. Cl.
*H04L 9/32* (2006.01)
*G06Q 20/36* (2012.01)

(56) References Cited

U.S. PATENT DOCUMENTS

| | | |
|---|---|---|
| 2011/0145056 A1 | 6/2011 | Sullivan et al. |
| 2012/0023568 A1 | 1/2012 | Cha et al. |
| 2013/0212699 A1 | 8/2013 | Pollard |
| 2016/0063657 A1 | 3/2016 | Chen et al. |
| 2019/0005223 A1* | 1/2019 | Messerges .............. G06F 21/34 |

OTHER PUBLICATIONS

Corrected Notice of Allowance from U.S. Appl. No. 16/274,070, dated Jul. 10, 2019, 7 pages.
International Search Report and Written Opinion for Application No. PCT/US2019/025221, dated Jul. 5, 2019, 10 pages.
Notice of Allowance from U.S. Appl. No. 16/274,070, dated May 28, 2019, 14 pages.

* cited by examiner

US 10,536,434 B2

GENERATING AND LINKING PRIVATE TRANSACTION IDENTIFIERS TO DISTRIBUTED DATA REPOSITORIES

BACKGROUND

There are many existing products and services that seek to obtain consent from consumers related to various uses of their private data. When insight information is sought regarding an individual in the context of a transaction related to that individual, privacy of the individual can be compromised due to the intentional or inadvertent leaking of such private information. For example, when a person seeks to obtain a mortgage or other type of financial loan, a loan provider typically performs a risk analysis process that requires the person to provide various items of private information such as a Social Security Number (SSN). This private information is then often used by the service provider to query various external data providers (for example, banks, credit card providers, and the like) to obtain historical information and other additional data about the individual possessed by the data providers. In many cases, the private information provided by the individual is retained afterwards by the service provider even though the service provider does not need to be in possession of the data beyond the completion of the requested transaction. The transmission, use, and retention of such private data by various service providers and data providers causes individuals' private data to be susceptible to many types of undesired uses.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media are described for generating and using semi-random private transaction identifiers for an individual or object that is meaningful to data owners such that the identifiers can be used by one or more data owners to perform internal queries while keeping the identity of the subject private.

In one embodiment, a user of an identity management service creates a user account with the identity management service and provides input indicating the user's consent to link their user account at the identity management service to one or more data providers. As described in more detail hereinafter, the linking of the user's account to one or more data providers causes each of the data providers to generate a respective cryptographically blinded transaction identifier (BTI). In an embodiment, the identity management service combines the respective BTIs to generate a group BTI (GBTI) that is retained by the identity management service. When the user desires to obtain a service from a service provider, the user securely obtains a generated identifier derived from the GBTI (or, in other examples, obtains the GBTI itself) from the identity management service and sends it securely to the service provider. The service provider then sends the obtained identifier (and possibly other information) to the data provider to prove that it has consent from the user to obtain desired data or insights about the user but without divulging the privacy of the user.

In another embodiment, when a user desires to obtain a service from a service provider, the service provider obtains an identifier of the user (for example, as part of a request generated by the user) and sends the obtained user identifier to the identity management service. The identity management service uses a stored mapping to determine the GBTI associated with the user based on the provided user identifier, and further derives one or more individual BTIs created by the respective data providers from the GBTI. As indicated above, the individual BTIs can be used by the service provider or identity management service to prove to the respective data providers that it has consent from the user to obtain desired data or insights.

Figure 1:
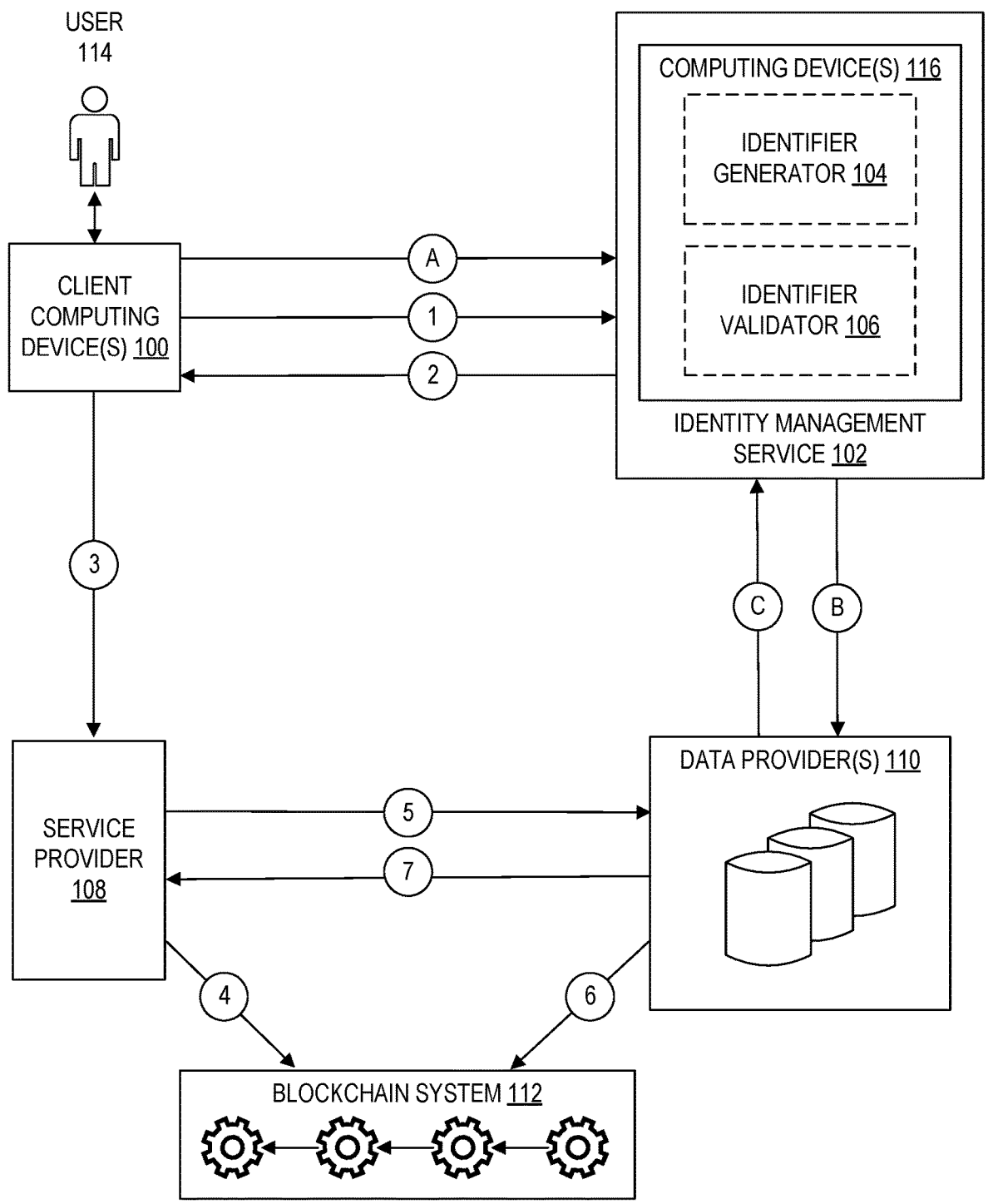
FIG. 1 is a diagram illustrating an environment for generating and using private transaction identifiers for an individual or object that are meaningful to data owners such that the identifiers can be used by one or more data owners to perform internal queries while keeping the identity of the subject private, according to some embodiments.

FIG. 1 is a diagram illustrating an environment for generating and using semi-random private transaction identifiers for users (for example, individuals or objects) that is meaningful to data owners such that it can be used by one or more data owners to perform internal queries for data related to the users while keeping the identity of users private, according to some embodiments. In some embodiments, an identity management service 102, among any number of other possible services, comprises one or more software modules executed by one or more electronic computing devices 116 at one or more data centers and geographic locations. A user 114 using one or more client computing device(s) 100 can interact with the identity management service 102 via one or more networks, such as the internet. The identity management service 102 can be hosted by computing device(s) running in an on-premises data center, a cloud-based service provider, or any combinations thereof 1. Registration and Linking Phase A registration and linking process is illustrated by the circles labeled "A"-"C" in FIG. 1 according to some embodiments. In one embodiment, one-to-one interactions illustrated in FIG. 1 (for example, between a client computing device 100 and the identity management service 102, or between the identity management service 102 and a data provider 110) are performed over secure communication channels (for example, over network connections based on the Transport Layer Security (TLS) or Hyper Text Transfer Protocol Secure (HTTPS) protocols). As indicated above, a user 114 can create a user account with an identity management service 102. In one embodiment, the creation of a user account can include a user using a client computing device 100 (for example, a desktop computer, laptop, mobile device, tablet computer, or any other type of computing device) to access the identity management service 102 (for example, using a web-based graphical user interface (GUI), mobile app, application programming interface (API), or any other interface used to access the identity management service 102 via one or more intermediate networks such as the internet) and providing one or more requested items of personally identifying information (PII). The identity management service 102 can use the user-provided PII and possibly other forms of multi-factor authentication (MFA) to verify the authenticity of the user.

In an embodiment, at circle "A" in FIG. 1, in the registration phase a user 114 (also sometimes referred to herein as an "individual" or "subject") uses a client computing device 100 to access the identity management service 102 and to generate a request to link the user's account to one or more data providers 110, where each of the data providers 110 possesses some amount of data related to the user 114. The request to link the user's account to one or more data providers 110 may be part of the initial registration process, as described above, or performed at any other time. For example, the linking of a user's account to one or more data providers 110 can take place automatically as part of an identity creation process performed by the user using interfaces provided by the identity management service 102, where the identity creation process involves verification of the user's identity by a set of one or more data owners.

In one embodiment, the request to link the user's account to one or more data providers 110 includes the user 114 causing the generation of a signed digital "consent ticket" that is provided to the identity management service 102. A consent ticket can be associated with an expiration time such that the consent ticket is valid for only a specified duration of time, where the duration of time can be specified by the user 114. Among other possible uses, the consent ticket enables the identity management service 102 to store data reflecting the consent provided by the user 114. In response to receiving the request to link the user's account to the one or more data providers 110, the identity management service 102 generates and sends a "consent receipt" to the user's client computing device 100, where a copy of the consent receipt can be stored at the client computing device 100 or any other storage location accessible to the client computing device 100.

In one embodiment, a user's account can be associated with one or more independent "personas," where each persona is associated with a respective key pair and a respective consent ticket. In this example, each persona represents the user's consent for one or more respective data providers 110 to perform one or more actions involving one or more specified data items associated with the user 114. For example, a user can have one persona indicating the user's consent for uses of the user's private data by a first set of data providers, and a second persona indicating the user's consent for uses of the user's private data by a second set of data providers, where the type of consent that is provided to the first set of data providers can be different from the type of consent provided to the second set of data providers. The user's consent associated with respective personas can also represent different subsets of data associated with one or more data providers. For example, a user can create a persona "A" and a separate persona "B" that are each associated with a same or overlapping set of data providers, but where the personas differ in the sets of data that can be used in relation to each persona (where the set of data associated with one persona may be a subset of the data associated with the other persona).

In one embodiment, the consent provided by a user can indicate permitted uses of specific items of the user's data possessed by one or more data provider 110. As an example, a user 114 might consent to their birthdate being used to evaluate whether the user 114 is an adult or not. As another example, a user 114 might consent to their credit score as stored by one or more data providers 110 being used to determine whether the user 114 is qualified for certain types of loans, and so forth. In some embodiments, the identity management service 102 causes display (for example, in a mobile app or web-based console) to users, for each of one or more data providers 110, various types of consent which can be provided by the user for items of data stored by that data provider 110, or the user 114 can manually specify various types of consent to uses of their data for certain data providers 110. In some embodiments, users can alternatively or additionally be presented with, for each of one or more data providers 110, various types of uses of their data for which the user can provide consent or not.

In an embodiment, the identity management service 102 retains pairs of <Consent-Ticket, Consent-Receipt> at a storage location managed by the identity management service. The identity management service 102 can further generate and record a hash of each value to an immutable digital ledger (such as a blockchain managed by a blockchain system 112) for logging purposes. Expired consent tickets (and their matching consent receipts) are archived.

In an embodiment, at circle "B," the identity management service 102 sends a request to the relevant data provider(s) 110 indicating that the user 114 has authorized (or consented) that their data possessed by the data provider 110 be linked to a private identifier that is meaningful only to the identity management service 102 and the data provider 110. In one embodiment, an identifier generator 104 of the identity management service 102 generates a private transaction identifier (PTI) using a cryptographic method that obfuscates the identity of the individual to external entities. The identity management service 102 sends the signed consent receipt (including personally identifying information identifying the user) and optionally the generated PTI to the relevant data provider(s) 110 with the request to link the user's data to the PTI. In other embodiments, the identity management service 102 sends only the consent receipt containing at least a portion of the user's PII but without generating a PTI and instead relies on the data provider(s) to generate PTI(s).

In an embodiment, a given data provider 110 receives the following from the identity management service 102: (i) a consent receipt, including some amount of PII for the user; (ii) optionally, a PTI for the user generated by the identity management service 102; (iii) optionally, pointer to a block in the blockchain managed by the blockchain system 112 that contains a hash of the consent receipt. The data provider 110 stores an association between the user's data possessed by the data provider 110 and the PTI obtained from the user's identity provider, or between the user's data at the data provider 110 and a PTI generated by the data provider 110 for the user. In some embodiments, the data provider 110 searches the blockchain to find the hash of the consent receipt to obtain assurance that the consent receipt has been logged by the identity provider.

In some embodiments, a data provider 110 can process requests received from the identity management service 102 using a software agent developed and provided by the identity management service but hosted by the data provider 110. In other examples, a data provider 110 can implement its own software agent according to specifications defined by the identity management service 102 to process such requests.

In an embodiment, at circle "C," the data provider 110 performs a cryptographic blinding of the PTI received from the identity management service 102, or the PTI generated by the data provider 110, to produce a blinded transaction identifier (BTI). The data provider 110 can generate the BTI, for example, using a combination of the PTI and a secret blinding factor known only to the data provider 110. The data provider 110 then returns the BTI generated for that user to the identity management service 102.

In an embodiment, the identity management service 102 merges the BTIs obtained from the group of relevant data providers 110 to obtain a group blinded transaction identifier (GBTI) for that user. The identity management service 102 stores the GBTI for a user throughout the duration of the validity of the consent specified by the user in request in circle "A," as described above.

Once a consent ticket associated with a user account expires or is revoked by the associated user or the identity management service 102, the GBTI for the same user account is archived by the identity management service 102. In the case of revocation, the identity management service 102 sends a notification message to each relevant data provider 110 indicating the revocation. Each data provider 110 archives their associated <PTI, BTI> pairs upon expiration or revocation of a consent receipt. To renew the consent, a user can repeat the processes described with respect to circles "A"-"C," if desired.

2. Deployment Phase

A deployment process is illustrated by the circles labeled "1" to "6" in FIG. 1 according to some embodiments. In an embodiment, the one-to-one interactions are performed over a secure channel (for example, over TLS or HTTPS), as described above.

In an embodiment, at circle "1," when a user 114 desires to obtain a service from a service provider 108 (for example, to obtain a loan from a loan provider), to enable computer-implemented systems associated with the service provider 108 to query the relevant data provider(s) 110, the user uses a client computing device 100 to obtain his/her group blinded transaction identifier (GBTI), or a value derived from the GBTI, from the identity management service 102. For example, a client computing device 100 can send a request to the identity management service 102 requesting the GBTI-based value associated with the user 114.

In an embodiment, at circle "2," the identity management service 102 retrieves the user's GBTI (for example, based on one or more identifiers included in the request sent at circle "1") and encapsulates the GBTI, or a value derived from the GBTI, inside a transaction access token (TAT) data structure (for example, as a JavaScript Object Notation JSON or JSON Web Tokens (JWT) formatted data object), which includes information identifying validation endpoint APIs belonging to the identity management service 102.

In an embodiment, the identity management service 102 digitally signs the TAT containing the GBTI or GBTI-derived value to prove to the service provider 108 that the token used by the user 114 is a genuine (not fake) token. The identity management service 102 then sends the TAT to the user's client computing device 100. In an embodiment, the TAT has its own lifetime value, where the TAT's lifetime does not exceed the lifetime of the consent ticket created at circle "A" of the registration process.

In an embodiment, at circle "3," upon requesting a service from the service provider 108, the user's client computing device 100 sends the TAT issued by the identity management service 102 to the service provider 108. The service provider 108 can check the signature on the TAT and optionally check its validity by sending the TAT to the validation endpoint provided by the identity management service 102.

In an embodiment, at circle "4," the service provider 108 receives (for example, at a server managed by the service provider 108) the following from the user's client computing device 100: (i) the TAT containing the GBTI; (ii) a hash of the consent ticket provided previously to the identity management service 102 in circle "A," as described above; and (iii) a hash of the consent receipt obtained from the identity management service 102 in circle "A" during the registration process. In an embodiment, the service provider 108 can validate the authenticity of these two hash values (as validated by the identity provider service in circle "A") by searching the blockchain for the hash values. For example, an identifier validator 106 component of the identity management service 102 can validate the authenticity of the hash values.

In an embodiment, the service provider 108 generates three separate hash values corresponding to the data items (i)-(iii) obtained from the user's client computing device 100, as described above, and records the generated hash values to a blockchain. For example, the service provider 108 can compute a hash of the received TAT, a hash of the consent ticket hash value, and a hash of the consent receipt hash value.

In an embodiment, at circle "5," when the service provider 108 seeks to obtain data and/or insights related to the user 114 to carry out the requested service(s), the service provider 108 sends the TAT containing the GBTI of the individual, or a value derived from the GBTI, to the relevant data provider(s) 110 together with a query used to obtain the desired data, or with an algorithm-choice indicator in the case the data provider 110 has a set of algorithms to choose from. In one embodiment, the service provider 108 signs the query data structure to ensure origin authenticity.

In another embodiment, the service provider 108 instead delivers the TAT to an intermediary system that then delivers the TAT to each data provider 110. The intermediary system may provide additional services such as aggregation and analysis of the responses from the data providers 110. In one embodiment, the identity management service 102 can act as such an intermediary system. In this example, with a trust relationship between the identity management service 102 and the data providers 110, the TAT can be terminated at the identity management service 102.

In an embodiment, at circle "6," the data provider 110 validates the TAT and checks that the GBTI-based value inside the token is valid. The data provider 110 can validate the GBTI-based value, for example, because during circle "C" of the registration phase the data provider 110 contributed its own blinded BTI to the generation of the GBTI. Prior to fulfilling the query, the data provider 110 checks that the TAT lifetime value remains valid (that is, checks that it has not exceeded the lifetime of the consent receipt which it obtained from the identity provider service in circle "B" of the registration process). In the example where the identity management service 102, or other intermediary system, delivers a TAT to each data provider, as described above, each TAT can include a data provider-specific BTI derived from the GBTI for the user.

In an embodiment, the data provider 110 computes: (i) a hash of the TAT it received; (ii) a hash of the identity of the service provider 108; and (iii) a hash of the consent receipt it received at circle "B." In some embodiments, the data provider 110 records these three hash values to a blockchain for logging purposes.

In an embodiment, at circle "7," once the GBTI validation is completed and hash values are optionally recorded on the blockchain, the data provider 110 executes the desired algorithm and returns the result to the requesting service provider 108. The result can be one or more requested data items possessed by the data provider and related to the user, one or more values or insights derived from data items related to the user, or any combination thereof.

Figure 2:
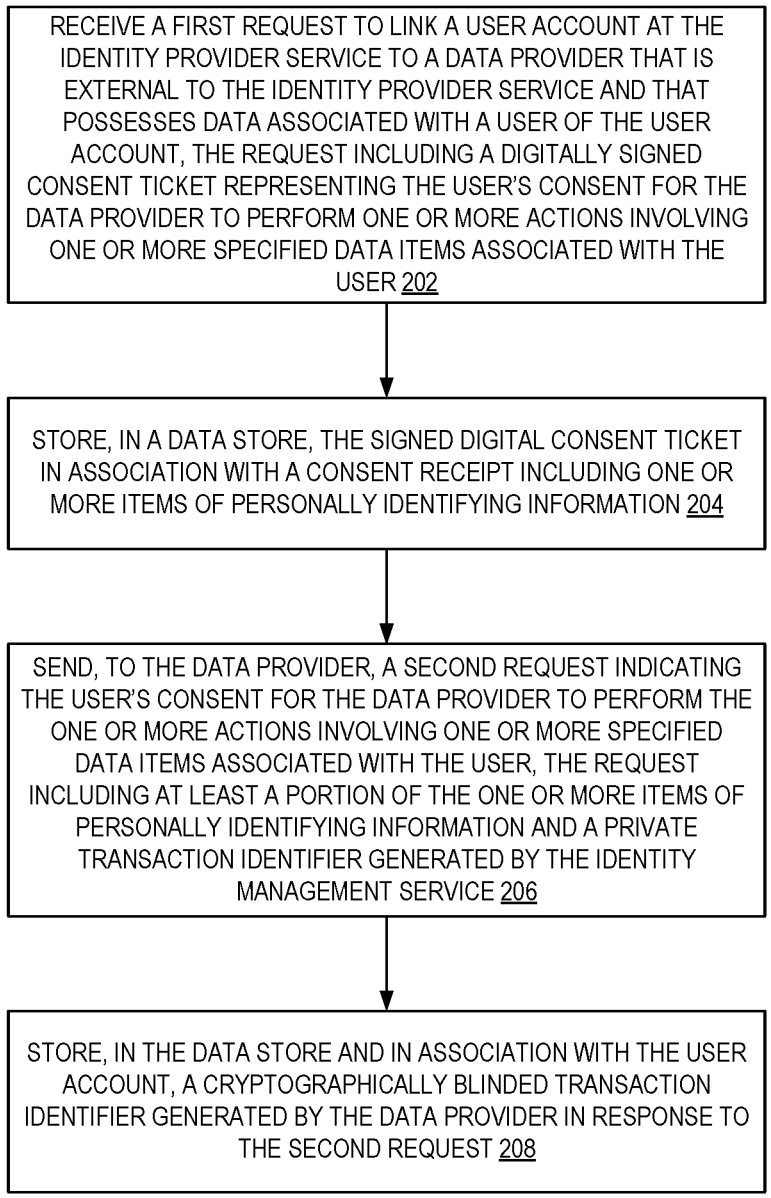
FIG. 2 is a flow diagram illustrating operations of a method for generating private transaction identifiers for an individual or object that are meaningful to the data owners such that it can be used by one or more data owners to perform internal queries based on the semi-random transaction identifier while keeping the identity of the subject private, according to some embodiments.

FIG. 2 is a flow diagram illustrating operations 200 of a method for generating semi-random private transaction identifiers for an individual or object that is meaningful to the data owners such that it can be used by one or more data owners to perform internal queries based on the semi-random transaction identifier while keeping the identity of the subject private. Some or all of the operations 200 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

The operations 200 include, at block 202, receiving, from a user device, a first request to link a user account at the identity management service to a data provider that is external to the identity management service and that possesses data associated with a user of the user account, the request including a digitally signed consent ticket representing the user's consent for the data provider to perform one or more actions involving one or more specified data items associated with the user. Referring to FIG. 1, for example, an identity management service 102 can receive a request from a client computing device 100 requesting to link a user account to one or more data providers 110.

The operations 200 further include, at block 204, storing, in a data store, the signed digital consent ticket in association with a consent receipt including one or more items of personally identifying information. The identity management service 102, for example, can store the signed digital consent ticket and consent receipt in a data store accessible to components of the identity management service 102. In one embodiment, the signed digital consent ticket and consent receipt, or values derived from the consent ticket and consent receipt, are stored on a public or private distributed ledger.

The operations 200 further include, at block 206, sending, to the data provider, a second request indicating the user's consent for the data provider to perform one or more actions involving one or more specified data items associated with the user, the request including at least a portion of the one or more items of personally identifying information and a private transaction identifier generated by the identity management service. The identity management service 102 can send the request to the data provider 110 (or possibly to any number of data providers 110) optionally including a PTI generated by the identity management service 102, where the PTI can be generated based on a key pair associated with the user account. In other examples, the identity management service 102 can send the request and the data provider (s) 110 can generate a PTI for the user account.

The operations 200 further include, at block 208, storing, in the data store and in association with the user account, a cryptographically blinded transaction identifier generated by the data provider in response to the second request. The cryptographically blinded transaction identifier, for example, can be generated by the data provider 110 based on the PTI generated by the identity management service 102 or by the data provider 110. In an embodiment, the cryptographically blinded transaction identifier can be combined by the identity management service 102 with transaction identifiers received from other data providers 110 for the same user account to obtain a group blinded transaction identifier.

Figure 3:
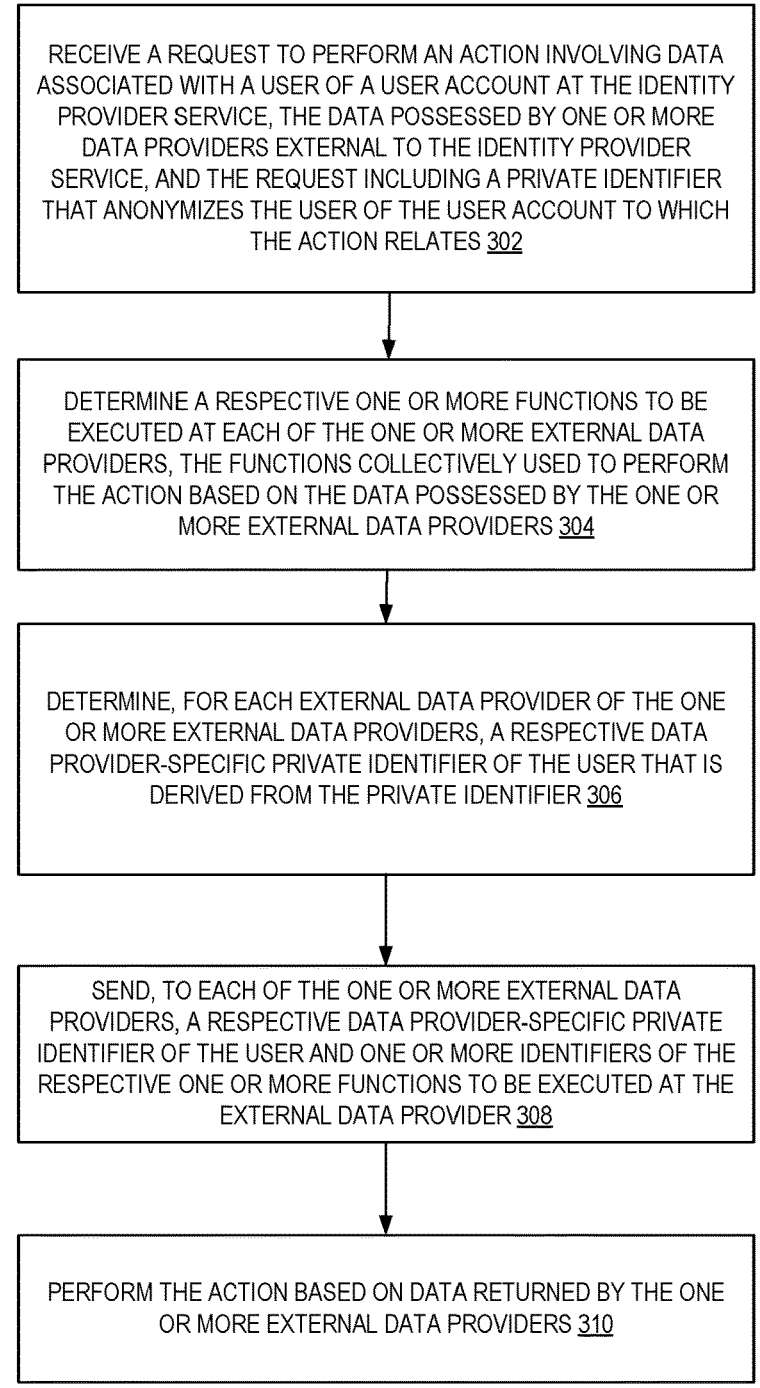
FIG. 3 is a flow diagram illustrating operations of a method for using semi-random private transaction identifiers for an individual or object to perform internal queries based on the semi-random transaction identifier while keeping the identity of the subject private, according to some embodiments.

FIG. 3 is a flow diagram illustrating operations 300 of a method for using semi-random private transaction identifiers for an individual or object to perform internal queries based on the semi-random transaction identifier while keeping the identity of the subject private. Some or all of the operations 300 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

The operations 300 include, at block 302, receiving a request to perform an action involving data associated with a user of a user account at the identity management service, the data possessed by one or more data providers external to the identity management service, and the request including a private identifier that anonymizes the user of the user account to which the action relates. For example, an identity management service 102 can receive a request from a client computing device 100 or from a service provider 108 to perform an action involving data associated with a user 114.

The operations 300 further include, at block 304, determining a respective one or more functions to be executed at each of the one or more external data providers, the functions collectively used to perform the action based on the data possessed by the one or more external data providers. The identity management service 102, for example, can determine the respective one or more functions to be executed based on a stored mapping between the requested action involving data associated with the user account and functions involving one or more data providers 110 used to carry out the requested action. The functions, for example, can include various queries and other processes that can be performed at the data providers 110 to obtain desired data items or derivative insights.

The operations 300 further include, at block 306, determining, for each external data provider of the one or more external data providers, a respective data provider-specific private identifier of the user that is derived from the private identifier. The data provider-specific private identifier, for example, can correspond to the identifier generated by the data provider(s) 110 for the user account during the registration and linking phase described herein.

The operations 300 further include, at block 308, sending, to each of the one or more external data providers, a respective data provider-specific private identifier of the user and one or more identifiers of the respective one or more functions to be executed at the external data provider. For example, the identity management service 102 can send the requests to the relevant data provider(s) 110 via a secure communication channel.

The operations 300 further include, at block 310, performing the action based on data returned by the one or more external data providers. The action can include, for example, relaying data returned from the data provider(s) 110, performing one or more operations on data returned from the data provider(s) 110, storing data returned from the data provider(s) 110, or any combinations thereof.

Examples of some embodiments are represented, without limitation, in the following numbered clauses:

In an embodiment, a method or non-transitory computer readable medium comprises: receiving, from a user computing device, a first request to link a user account at the identity management service to a data provider that is external to the identity management service and that possesses data associated with a user of the user account, the first request including a digitally signed consent ticket representing the user's consent for the data provider to perform one or more actions involving one or more specified data items associated with the user; storing, in a data store, the signed digital consent ticket in association with a consent receipt including one or more items of personally identifying information; sending, to the data provider, a second request indicating the user's consent for the data provider to perform the one or more actions involving one or more specified data items associated with the user, the request including at least a portion of the one or more items of personally identifying information and a private transaction identifier generated by the identity management service; and storing, in the data store and in association with the user account, a cryptographically blinded transaction identifier generated by the data provider in response to the second request.

In an embodiment, a method or non-transitory computer readable medium comprises: wherein the first request is a request to link the user account at the identity management service to a plurality of data providers that possess data associated with the user of the user account, wherein the identity management service receives a plurality of cryptographically blinded transaction identifiers from the plurality of data providers, and wherein the method further comprises generating a group blinded transaction identifier based on the plurality of cryptographically blinded transaction identifiers.

In an embodiment, a method or non-transitory computer readable medium comprises: receiving input specifying an expiration time at which the signed digital consent ticket is to be no longer valid; and storing the expiration time in association with the signed digital consent ticket.

In an embodiment, a method or non-transitory computer readable medium comprises: wherein the digitally signed consent ticket and the consent receipt are stored on a distributed ledger.

In an embodiment, a method or non-transitory computer readable medium comprises: wherein the signed digital consent ticket is based on a key pair generated by the identity management service for the user account.

In an embodiment, a method or non-transitory computer readable medium comprises: wherein the user account is associated with a plurality of personas, wherein each persona of the plurality of personas is associated with a respective key pair and a respective consent ticket, and wherein each persona respectively represents the user's consent for one or more data providers to perform one or more actions involving one or more specified data items associated with the user.

In an embodiment, a method or non-transitory computer readable medium comprises: receiving a request to perform an action involving data associated with a user of a user account at the identity management service, the data possessed by one or more data providers external to the identity management service, and the request including a private identifier that anonymizes the user of the user account to which the action relates; determining a respective one or more functions to be executed at each of the one or more external data providers, the functions collectively used to perform the action based on the data possessed by the one or more external data providers; determining, for each external data provider of the one or more external data providers, a respective data provider-specific private identifier of the user that is derived from the private identifier; sending, to each of the one or more external data providers, a respective data provider-specific private identifier of the user and one or more identifiers of the respective one or more functions to be executed at the external data provider; and performing the action based on data returned by the one or more external data providers.

In an embodiment, a method or non-transitory computer readable medium comprises: wherein the request to perform the action involving data associated with the user of the user account at the identity management service is received from one of: a user device, a server managed by a service provider.

In an embodiment, a method or non-transitory computer readable medium comprises: wherein a respective one or more functions include a query to be executed against data stored by a corresponding external data provider of the one or more data providers.

In an embodiment, a method or non-transitory computer readable medium comprises: wherein the request to perform the action involving data associated with the user of the user account at the identity management service is formatted as a JSON-based token including the private identifier.

Other examples of these and other embodiments are found throughout this disclosure.

Implementation Mechanism—Hardware Overview

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 4:
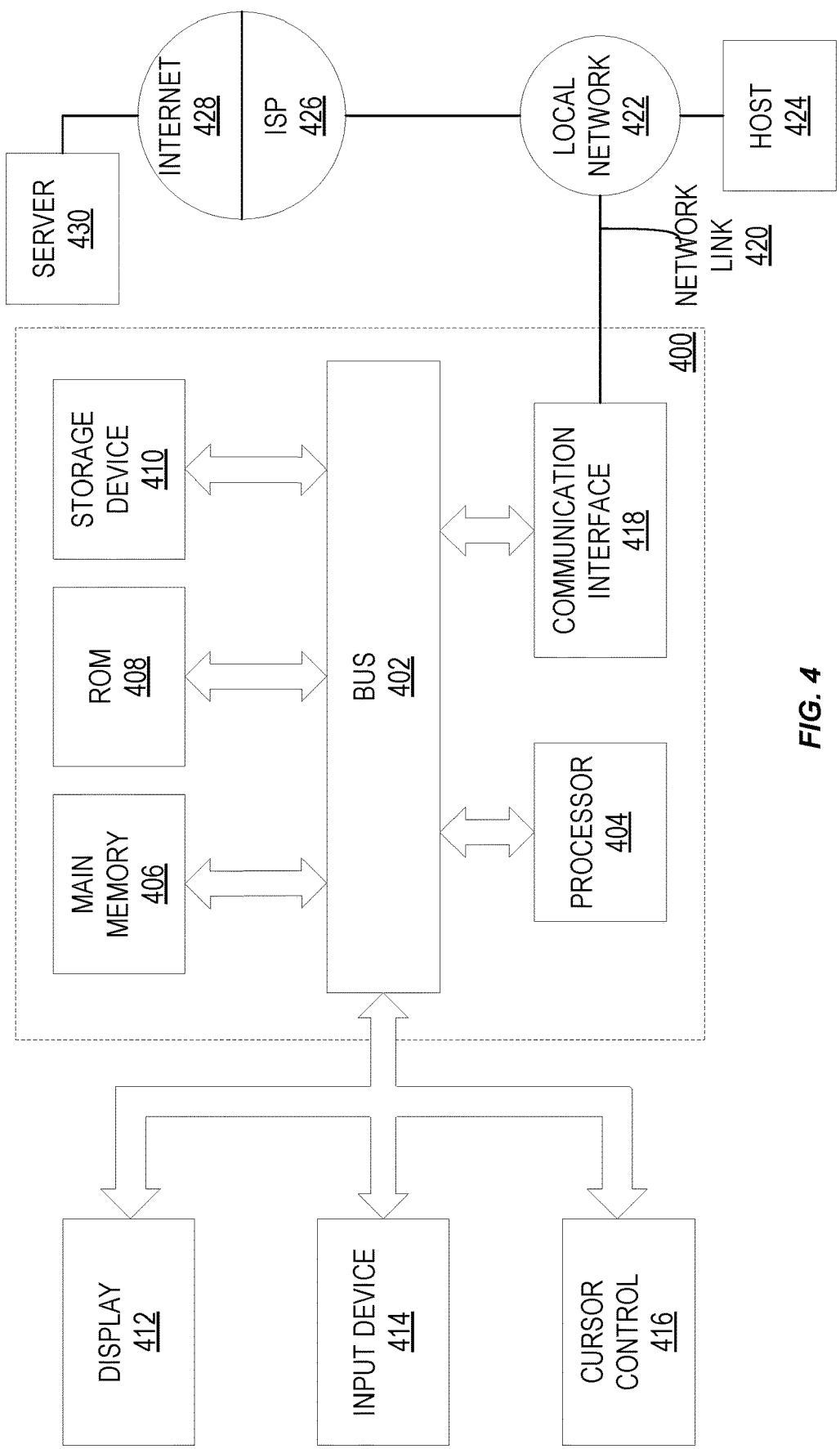
FIG. 4 illustrates a computer system upon which embodiments may be implemented.

FIG. 4 is a block diagram that illustrates a computer system 400 utilized in implementing the above-described techniques, according to an embodiment. Computer system 400 may be, for example, a desktop computing device, laptop computing device, tablet, smartphone, server appliance, computing mainframe, multimedia device, handheld device, networking apparatus, or any other suitable device.

Computer system 400 includes one or more buses 402 or other communication mechanism for communicating information, and one or more hardware processors 404 coupled with buses 402 for processing information. Hardware processors 404 may be, for example, general purpose microprocessors. Buses 402 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 400 also includes a main memory 406, such as a random access memory (RAM) or other dynamic or volatile storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 a special-purpose machine that is customized to perform the operations specified in the instructions.

Computer system 400 further includes one or more read only memories (ROM) 408 or other static storage devices coupled to bus 402 for storing static information and instructions for processor 404. One or more storage devices 410, such as a solid-state drive (SSD), magnetic disk, optical disk, or other suitable non-volatile storage device, is provided and coupled to bus 402 for storing information and instructions.

Computer system 400 may be coupled via bus 402 to one or more displays 412 for presenting information to a computer user. For instance, computer system 400 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 412 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 412.

One or more input devices 414 are coupled to bus 402 for communicating information and command selections to processor 404. One example of an input device 414 is a keyboard, including alphanumeric and other keys. Another type of user input device 414 is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. Yet other examples of suitable input devices 414 include a touch-screen panel affixed to a display 412, cameras, microphones, accelerometers, motion detectors, and/or other sensors. In an embodiment, a network-based input device 414 may be utilized. In such an embodiment, user input and/or other information or commands may be relayed via routers and/or switches on a Local Area Network (LAN) or other suitable shared network, or via a peer-to-peer network, from the input device 414 to a network link 420 on the computer system 400.

A computer system 400 may implement techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 400 can receive the data on the network and demodulate the signal to decode the transmitted instructions. Appropriate circuitry can then place the data on bus 402. Bus 402 carries the data to main memory 406, from which processor 404 retrieves and executes the instructions. The instructions received by main memory 406 may optionally be stored on storage device 410 either before or after execution by processor 404.

A computer system 400 may also include, in an embodiment, one or more communication interfaces 418 coupled to bus 402. A communication interface 418 provides a data communication coupling, typically two-way, to a network link 420 that is connected to a local network 422. For example, a communication interface 418 may be an integrated services digital network (ISDN) card, cable modem, satellite modem, or a modem to provide a data communication connection to a corresponding type of telephone line. As another example, the one or more communication interfaces 418 may include a local area network (LAN) card to provide a data communication connection to a compatible LAN. As yet another example, the one or more communication interfaces 418 may include a wireless network interface controller, such as a 802.11-based controller, Bluetooth controller, Long Term Evolution (LTE) modem, and/or other types of wireless interfaces. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by a Service Provider 426. Service Provider 426, which may for example be an Internet Service Provider (ISP), in turn provides data communication services through a wide area network, such as the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

In an embodiment, computer system 400 can send messages and receive data, including program code and/or other types of instructions, through the network(s), network link 420, and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. As another example, information received via a network link 420 may be interpreted and/or processed by a software component of the computer system 400, such as a web browser, application, or server, which in turn issues instructions based thereon to a processor 404, possibly via an operating system and/or other intermediate layers of software components.

In an embodiment, some or all of the systems described herein may be or comprise server computer systems, including one or more computer systems 400 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method performed by one or more servers hosted by an identity management service, the method comprising:

receiving, from a user computing device, a first request to link a user account at the identity management service to a plurality of data providers that are external to the identity management service and that each possess data associated with a user of the user account, the first request including a digitally signed consent ticket representing the user's consent for each of the plurality of data providers to perform one or more actions involving one or more specified data items associated with the user;

storing, in a data store, the signed digital consent ticket in association with a consent receipt including one or more items of personally identifying information;

sending, to each of the plurality of data providers, a second request indicating the user's consent for the data provider to perform the one or more actions involving one or more specified data items associated with the user, the second request including at least a portion of the one or more items of personally identifying information and a private transaction identifier generated by the identity management service;

receiving a plurality of cryptographically blinded transaction identifiers from the plurality of data providers;

generating a group blinded transaction identifier based on the plurality of cryptographically blinded transaction identifiers; and storing, in the data store and in association with the user account, the group blinded transaction identifier.

2. The computer-implemented method of claim 1, further comprising:
receiving input specifying an expiration time at which the signed digital consent ticket is to be no longer valid; and
storing the expiration time in association with the signed digital consent ticket.

3. The computer-implemented method of claim 1, wherein the digitally signed consent ticket and the consent receipt are stored on a distributed ledger.

4. The computer-implemented method of claim 1, wherein the signed digital consent ticket is signed using a private key of a public/private key pair associated with the user account.

5. The computer-implemented method of claim 1, wherein the user account is associated with a plurality of personas, wherein each persona of the plurality of personas is associated with a respective key pair and a respective consent ticket, and wherein each persona respectively represents the user's consent for one or more data providers to perform one or more actions involving one or more specified data items associated with the user.

6. A system comprising:
an identity management service implemented by a first one or more electronic devices comprising at least one hardware processor, the identity management service including first instructions that upon execution by the at least one hardware processor cause the identity management service to:
receive, from a user device, a first request to link a user account at the identity management service to a plurality of data providers that are external to the identity management service and that each possess data associated with a user of the user account, the request including a digitally signed consent ticket representing the user's consent for each of the plurality of data providers to perform one or more actions involving one or more specified data items associated with the user,
store, in a data store, the signed digital consent ticket in association with a consent receipt including one or more items of personally identifying information,
send, to each of the plurality of data providers, a second request indicating the user's consent for the data provider to perform the one or more actions involving one or more specified data items associated with the user, the request including at least a portion of the one or more items of personally identifying information,
receive a plurality of cryptographically blinded transaction identifiers from the plurality of data providers,
generating a group blinded transaction identifier based on the plurality of cryptographically blinded transaction identifiers, and
store, in the data store and in association with the user account, the group blinded transaction identifier; and
a data provider service of a data provider of the plurality of data providers, the data provider service implemented by a second one or more electronic devices comprising at least one hardware processor, the data provider service including second instructions that upon execution by the at least one hardware processor cause the data provider service to:
receive the second request indicating the user's consent for the data provider to perform the one or more actions involving one or more specified data items associated with the user,
generate a private transaction identifier for the user, and
store the private transaction identifier in association with data related to the user possessed by the data provider service.

7. The system of claim 6, wherein the first instructions further cause the identity management service to:
receive input specifying an expiration time at which the signed digital consent ticket is to be no longer valid; and
store the expiration time in association with the signed digital consent ticket.

8. The system of claim 6, wherein the digitally signed consent ticket and the consent receipt are stored on a distributed ledger.

9. The system of claim 6, wherein the private transaction identifier is generated based on an identifier associated with the user account.

10. The system of claim 6, wherein the user account is associated with a plurality of personas, wherein each persona of the plurality of personas is associated with a respective key pair and a respective consent ticket, and wherein each persona respectively represents the user's consent for one or more data providers to perform one or more actions involving one or more specified data items associated with the user.

11. A non-transitory computer-readable storage medium storing instructions which, when executed by one or more processors, cause performance of operations comprising:
receiving, from a user device, a first request to link a user account at an identity management service to a plurality of data providers that are external to the identity management service and that each possess data associated with a user of the user account, the request including a digitally signed consent ticket representing the user's consent for each of the plurality of data providers to perform one or more actions involving one or more specified data items associated with the user;
storing, in a data store, the signed digital consent ticket in association with a consent receipt including one or more items of personally identifying information;
sending, to each of the plurality of data providers, a second request indicating the user's consent for the data provider to perform the one or more actions involving one or more specified data items associated with the user, the request including at least a portion of the one or more items of personally identifying information;
receiving a plurality of cryptographically blinded transaction identifiers from the plurality of data providers;
generating a group blinded transaction identifier based on the plurality of cryptographically blinded transaction identifiers; and
storing, in the data store and in association with the user account, a cryptographically blinded transaction identifier generated by the data provider in response to the second request.

12. The non-transitory computer-readable storage medium of claim 11, the operations further comprising:
receiving input specifying an expiration time at which the signed digital consent ticket is to be no longer valid; and
storing the expiration time in association with the signed digital consent ticket.

13. The non-transitory computer-readable storage medium of claim 11, wherein the digitally signed consent ticket and the consent receipt are stored on a distributed ledger.

* * * * *